(12) United States Patent
McKinney

(10) Patent No.: US 12,124,560 B2
(45) Date of Patent: Oct. 22, 2024

(54) KEYSTROKE CIPHER PASSWORD MANAGEMENT SYSTEM AND METHOD FOR MANAGING AND PROTECTING MASTER PASSWORDS WITHOUT EXPOSING TO OTHERS

(71) Applicant: Andre McKinney, Columbia, MD (US)

(72) Inventor: Andre McKinney, Columbia, MD (US)

(*) Notice: Subject to any disclaimer, the term of this patent is extended or adjusted under 35 U.S.C. 154(b) by 344 days.

(21) Appl. No.: 17/512,371

(22) Filed: Oct. 27, 2021

(65) Prior Publication Data
US 2022/0138310 A1    May 5, 2022

Related U.S. Application Data

(60) Provisional application No. 63/109,865, filed on Nov. 4, 2020.

(51) Int. Cl.

| | | |
|---|---|---|
| G06F 21/45 | (2013.01) | |
| G06F 13/38 | (2006.01) | |
| G06F 13/42 | (2006.01) | |
| G08B 13/196 | (2006.01) | |
| H04L 9/08 | (2006.01) | |
| H04L 9/32 | (2006.01) | |
| H04L 9/40 | (2022.01) | |
| G01S 19/16 | (2010.01) | |

(52) U.S. Cl.
CPC ............ *G06F 21/45* (2013.01); *G06F 13/382* (2013.01); *G06F 13/4282* (2013.01); *G08B 13/196* (2013.01); *H04L 9/0863* (2013.01); *H04L 9/0877* (2013.01); *H04L 9/3226* (2013.01); *H04L 63/083* (2013.01); *H04L 63/0876* (2013.01); *H04L 63/0884* (2013.01); *G01S 19/16* (2013.01); *G06F 2213/0042* (2013.01)

(58) Field of Classification Search
CPC .... G06F 21/45; G06F 13/382; G06F 13/4282; G06F 2213/0042; G06F 21/31; G06F 21/34; G06F 21/606; G06F 21/6209; G08B 13/196; H04L 9/0863; H04L 9/0877; H04L 9/3226; H04L 63/083; H04L 63/0876; H04L 63/0884; H04L 9/3234; H04L 63/10; H04L 63/0853; G01S 19/16
USPC .......................................................... 726/6
See application file for complete search history.

(56) References Cited

U.S. PATENT DOCUMENTS

| | | | | |
|---|---|---|---|---|
| 8,176,324 B1 * | 5/2012 | Krishnamurthy | ...... | G06Q 20/10 713/168 |
| 2008/0065746 A1 * | 3/2008 | Moghaddam | ......... | H04W 12/08 709/220 |

(Continued)

*Primary Examiner* — Bryan F Wright

(57) ABSTRACT

A system and a method provided for managing and protecting master passwords from technicians/employees requiring access to at least one of the security systems such as an access control, a CCTV/surveillance system, burglar alarm and fire alarm system on a network with no internet access. The method involves creating a ciphered version of a master password i.e., a ciphered password on a password management server, transmitting the ciphered password to a Smartphone application installed on a user's device after authenticating the user. Further, securely transferring the ciphered password to an Intelligent USB Drive via Bluetooth®, by authenticating the USB Drive with the user's device. The USB drive is then connected to the security system via a USB port or GUI interface to access the security system.

20 Claims, 6 Drawing Sheets

(56) References Cited

U.S. PATENT DOCUMENTS

| | | | |
|---|---|---|---|
| 2014/0019768 A1* | 1/2014 | Pineau | H04L 9/3231 713/186 |
| 2015/0269369 A1* | 9/2015 | Hamid | G06F 21/45 726/5 |
| 2016/0028713 A1* | 1/2016 | Chui | G06F 21/35 726/4 |
| 2019/0163893 A1* | 5/2019 | Rodriguez Bravo | G06F 21/85 |

* cited by examiner

KEYSTROKE CIPHER PASSWORD MANAGEMENT SYSTEM AND METHOD FOR MANAGING AND PROTECTING MASTER PASSWORDS WITHOUT EXPOSING TO OTHERS

CROSS REFERENCE TO RELATED APPLICATIONS

This application claims priority on U.S. Provisional Patent Application No. 63/109,865, entitled "Keystroke Cipher Password Management System and Method", filed on Nov. 4, 2020, which is incorporated by reference herein in its entirety and for all purposes.

Field of the Invention

The present invention relates to the field of password management system and method. More particularly, the invention provides a keystroke cipher password management system and method of managing and protecting master passwords without exposing to the technicians/employees that need access to a security system such as an Access control, Closed Circuit Television (CCTV)/Surveillance system, Burglar alarm and Fire Alarm system etc.

BACKGROUND OF THE INVENTION

Most of the websites such as banking websites, social networking websites, and online shopping websites etc., require users to provide login credentials such as username and password in order to access their features. Similarly, electronic devices such as mobile devices, computers, ATMs and various other devices require password in order to access their features.

In general, a password is required to access a secure website, secure device or secure system in effective way and is also a convenient method to protect access to crooks, hackers, fraudsters, and other unauthorized persons and also to protect any vulnerable activity by them.

The password generally comprises number of characters, numerals and special characters or combination thereof. However, most of time these passwords may be overcome or cracked. Hence, it is to protect the information in such situations very complex passwords are being used. However, the complex passwords can be hard to remember accurately and also most of time users choose different passwords for each different log-in account.

Many research in information security indicates that passwords are not well adapted to the way human process information. In general, users find passwords difficult to remember and a solution is that many users adopt to reduce the complexity and number of passwords across applications, whereas it reduces the security level obtained through the passwords. This situation becomes increasingly worsen as setting up user accounts and passwords on more and more web based connected information applications. On the other hand, using simple passwords and reusing them in multiple applications makes us vulnerable to malicious information hackers.

Therefore, several password managers have been commercially developed and are used by several users to manage their passwords.

Most of the password managers store passwords of the users for multiple accounts/logins. This allows the users to easily recall their passwords using their password managers when they go to the internet websites and systems that require password access. The passwords managers are generally software-based applications, and require the user to create and change the passwords of their internet websites and systems accounts locally on their computing device, and then update the password manager database with the updated passwords. These password managers act as a single storage point for the user's multiple passwords.

Further, the user retains the knowledge of their passwords even after employing the password manager since the users themselves generate their passwords and use the password managers as a storage facility for the passwords. The creation of multiple passwords for multiple accounts may be burdensome for the users, and, in addition, when several websites and systems require the user to change the password every couple of weeks or months, it becomes even bigger burden for some users. Some password managers may also provide setting up a single password for multiple accounts/logins. This approach is quite vulnerable to data breaches because if the password of one of the accounts/logins is leaked then it may lead to unauthorized access to the other websites/systems, where the user has accounts as well.

Further, the security of data-at-rest is of increasing concern to businesses, security agencies, government agencies, and other institutions.

Therefore, many password managers have been developed that require the user to remember only a single "master password" and the password manager itself deals with dozens of passwords that correspond with dozens of accounts/logins.

However, these password managers store user's login information for all the websites, systems and help logging into them automatically. They encrypt user password database with a master password, the master password is the only one a user has to remember. Unfortunately, while using one master password to manage the access to the all passwords, the security of the master password is still questionable. To address this problem, frequent password change is still required, which make it again inconvenient for user to do so and further to remember it.

Encrypting data-at-rest is a key protection against a data breach. Encryption of data prevents visibility in the event of unauthorized access and is commonly used to protect data-in-use or data-in-transit, and/or to protect the storage medium that stores data-at-rest. So, to access a data require a password and/or an encryption key that unlocks the data system to decrypt all its contents.

U.S. patent application Ser. No. 15/620,833 discloses a mobile device application with multi-factor authentication. In which, with the help of a password management mobile app that escrow the password into two parts and stored in two physical locations. Where a first part is stored in a separate user's gadget like a keyfob and a second part is stored on a mobile device, and connecting the first part and the second part together by the password manager mobile app executing in the mobile device, where any reconstitution of each password requires the user have on-hand both the mobile device and the separate user's gadget and then fetching, concatenating, and decrypting both into a whole password with the password manager mobile app executing in the mobile device.

U.S. patent application Ser. No. 16/038,011 discloses a password management using public-private key cryptography. In which a user device generates a public-private key pair including a public key and a private key and registers the public key with a remote password management server, account names and passwords can be stored at the password management server in association with the public key. To retrieve the passwords, the user device sends a request to the password management server including the public key. The password management server determines the password from the stored passwords and encrypts it using the public key. The encrypted password is then sent to the user device, which can decrypt the encrypted password using the private key corresponding to the public key. The user device can then use the account name and password to obtain account information from an account provider.

U.S. patent application Ser. No. 14/791,595 discloses cloud-based active password manager to provide users the ability to automatically update the passwords of each of the one or more website accounts.

U.S. patent application Ser. No. 16/106,564 discloses a password less method for securing data-at-rest. The method includes encrypting and/or decrypting data with a cryptographic key.

U.S. patent application Ser. No. 16/055,358 discloses receiving authentication credentials from a user to begin a session with a computing service, wherein the authentication credentials are used to generate encrypted user data associated with the computing service by generating a credential-cipher key. Using the credential-cipher key, the authentication credentials generates session-resume data, stores the generated session-resume data, and deletes the credential-cipher key from the system.

U.S. patent application Ser. No. 15/620,833 discloses encrypting and decrypting data using cryptographic keys directly from a user's password and a user's recovery element. It provides a password and at least one recovery element, derives a password derived encryption key based on the password, derives a recovery element derived encryption key based on the recovery element, encrypts a master encryption key stored in temporary memory using the password derived encryption key to generate a password encryption key cipher for storage in non-transitory memory, further encrypts the master encryption key stored in the temporary memory using the recovery element derived encryption key to generate a recovery element encryption key cipher for storage in the non-transitory memory, and upon encrypting the master encryption key, using the password derived encryption key and the recovery element derived encryption key clears the master encryption key from the temporary memory.

It is understood that using cryptographic techniques ensure confidentiality, integrity, resisting, denying, transmission and access to the data and the system.

However, companies in the security industry have to maintain passwords of the security systems such as an access control, CCTV/surveillance system, burglar alarm, intrusion detection and fire alarm system for multiple vendors, on networks that have an internet air gap. These passwords are now maintained with spreadsheets or databases that are shared by all employees that need access to the systems. When technicians/employees that have access to these passwords and systems are fired or resign, all the passwords that they've had access to need to be changed.

It is very challenging to manage passwords for the security systems on networks with air gapped that have no connection to the internet and there are no existing applications or technology that manages passwords for these systems and the technicians/employees that access them. Consequently, when users lose access, passwords need to be manually changed, for various purposes, on all systems that the former technicians/employee had access to which leads to multiple passwords on multiple systems. This manual process is time intensive, vulnerable and not efficient.

The prior art is not yet able to protect master passwords of the security system from technicians/employees that need access on networks with air gaps (no internet access).

Therefore, there is a need for a system and method to improve both the convenience and the security of password-based user authentication.

SUMMARY OF THE INVENTION

In order to solve the above problems, the present invention provides Keystroke Cipher Password Management System and Method for use in the security industries/agencies that has an ability to add users, remove users and validate users while retaining the master password safe without exposing the password from viewing by users.

The Keystroke Cipher Password Management System and method of the present invention can be used for managing and protecting master passwords from technicians/employees that need access to the security systems such as including an access control, CCTV camera, burglar alarm and fire alarm system on the networks with air gaps (no Internet access).

One aspect of the present invention is Keystroke Cipher Password Management System for managing and protecting a master password without exposing to technicians/employees accessing to at least one security system on a network with no internet access, the system comprising a security/proxy server, implemented with a password management server for authenticating/validating one or more user devices by a Device ID, where the Device ID further includes the GPS location of the user device for initiating a season and also storing configuration logins at logout of the session. Where the web based password management server, comprising; at least one processing unit, at least one non-transitory memory storing instructions that, when executed by the processing unit, configure to create a cipher password from a master password of an account of a user, and derive an encryption key based at least in part on the cipher password. Where a Smartphone application is configured to receive the cipher password with the encryption key on the user device and an intelligent USB drive is configured to receive the cipher password with the encryption key from the Smartphone application by securely authenticating the user on the Smartphone application, further securely authenticating the intelligent USB drive by the Smartphone application using Bluetooth® as the communication protocol, wherein, the USB drive is connected to a client server or security system directly to enter the ciphered password with the encryption key, where the USB drive comprises a Graphical User Interface (GUI) and a Keystroke emulator application, when the USB drive is connected to the client server or the security system, the user is navigated to the Graphical user interface (GUI) and the Keystroke emulator application is activated that deciphers and enters the ciphered password with the encryption key hidden from the user's view.

In one more aspect of the present invention, the password management server includes a user authentication interface that is configured to facilitate authentication services for authenticating users and devices attempting to access various resources of the security system. In some implementations, the password management server stores and manages all the master passwords and provides a secure data communications link between a client server and a Smartphone application.

In one more aspect of the present invention, the password management server creates a cipher password developed from a master password and passes ciphered version of password to the user's Smartphone application with the cipher key. The cipher password is then Bluetoothed, or with a USB Smartphone adapter, to the Intelligent USB drive and that can be connected to the client server, or the security system, for accessing the features of the security system. The USB drive is configured with Graphical User Interface (GUI) and a Keystroke emulator application for configuration log to validate and store configuration information. While authenticating users and attempting to access the security system, the user is navigated to the GUI or system URL and the Keystroke emulator application is activated that deciphers and enters the ciphered password with the encryption key hidden from the user's view.

Further if any changes made to the security system's configuration are logged, and then uploaded back to the password management server via the Smartphone application to monitor unauthorized changes. Any needed updates to the application software will be logged and uploaded through USB drive, Smartphone app or corporate based internet attached docking station. Further, the Keystroke Cipher Password Management System includes provisions for adding a new user and/or removing an existing user from the system.

The Smartphone application communicates with a web-based password management server via cellular or WiFi, and receives an encrypted ciphered password. Then pass the information to an Intelligent USB/thumb drive with the Keystroke Cipher software installed. Once the USB drive is inserted into the system USB port of the client server or security system, the ciphered version of the password is displayed on the Smartphone. The technician/employees open the Graphical User Interface (GUI) for the security system and enters the ciphered password, where the Keystroke Cipher application provides the actual password which is not visible to the technicians/employees.

In another aspect of the present invention provides, a method of managing and protecting a master password from technicians/employees that need access to at least one security system, the method comprising: creating a ciphered password with an encryption key of a master password of an account of a user by a password management server; transmitting the ciphered password on a Smartphone application on a user device by securely authenticating the user on the Smartphone application; receiving the ciphered password on the USB drive by securely authenticating the USB drive with the Smartphone Application on the user device; and connecting the USB drive to a client server or a security system, wherein, the USB drive comprising a Graphical User Interface (GUI) and a Keystroke emulator application, when the USB drive is connected to the client server or the security system, the user is navigated to the Graphical user interface (GUI) and the Keystroke emulator application is activated that deciphers and enters the ciphered password with the encryption key hidden from the user's view.

Further in another aspect, the USB drive records changes to system and provides a log to the Smartphone application, this log is used to prevent unauthorized changes of the master password and configuration changes.

The summary of the invention is not intended to limit the key features and essential technical features of the claimed invention, and is not intended to limit the scope of protection of the claimed embodiments.

BRIEF DESCRIPTION OF THE DRAWINGS

The object of the invention may be understood in more details and more particularly description of the invention briefly summarized above by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DETAILED DESCRIPTION OF THE INVENTION

The present invention will now be described more fully hereinafter with reference to the accompanying drawings in which a preferred embodiment of the invention is shown. This invention may, however, be embodied in many different forms and should not be construed as being limited to the embodiment set forth herein. Rather, the embodiment is provided so that this disclosure will be thorough, and will fully convey the scope of the invention to those skilled in the art.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.\

Described herein is a Keystroke Cipher Password Management System and Method for protecting master passwords from technicians/employees that need access to at least one of the security systems on networks with air gaps (no internet access). The security systems according the present invention include such as access control, Closed Circuit Televisions (CCTVs)/surveillance systems, burglar alarms and fire alarm systems. Further, embodiments of the present invention provide managing, changing and updating user's password for one or more accounts/login.

Various embodiments provide data encryption techniques enabling for creating ciphered password of a master password and using the ciphered password with protected encryption keys to at least one of the security systems on networks with air gaps (no internet access). Further, for example, when an associated user loses his password, the ciphered password is encrypted using a user's master password and can be used to access the security systems. Further, for example, when an employee/technician leaves the organization, the user may change the password without exposing the password to new employee/technician and further provides the underlying encrypted data to security vulnerabilities associated with typical password recovery mechanisms.

Figure 1:
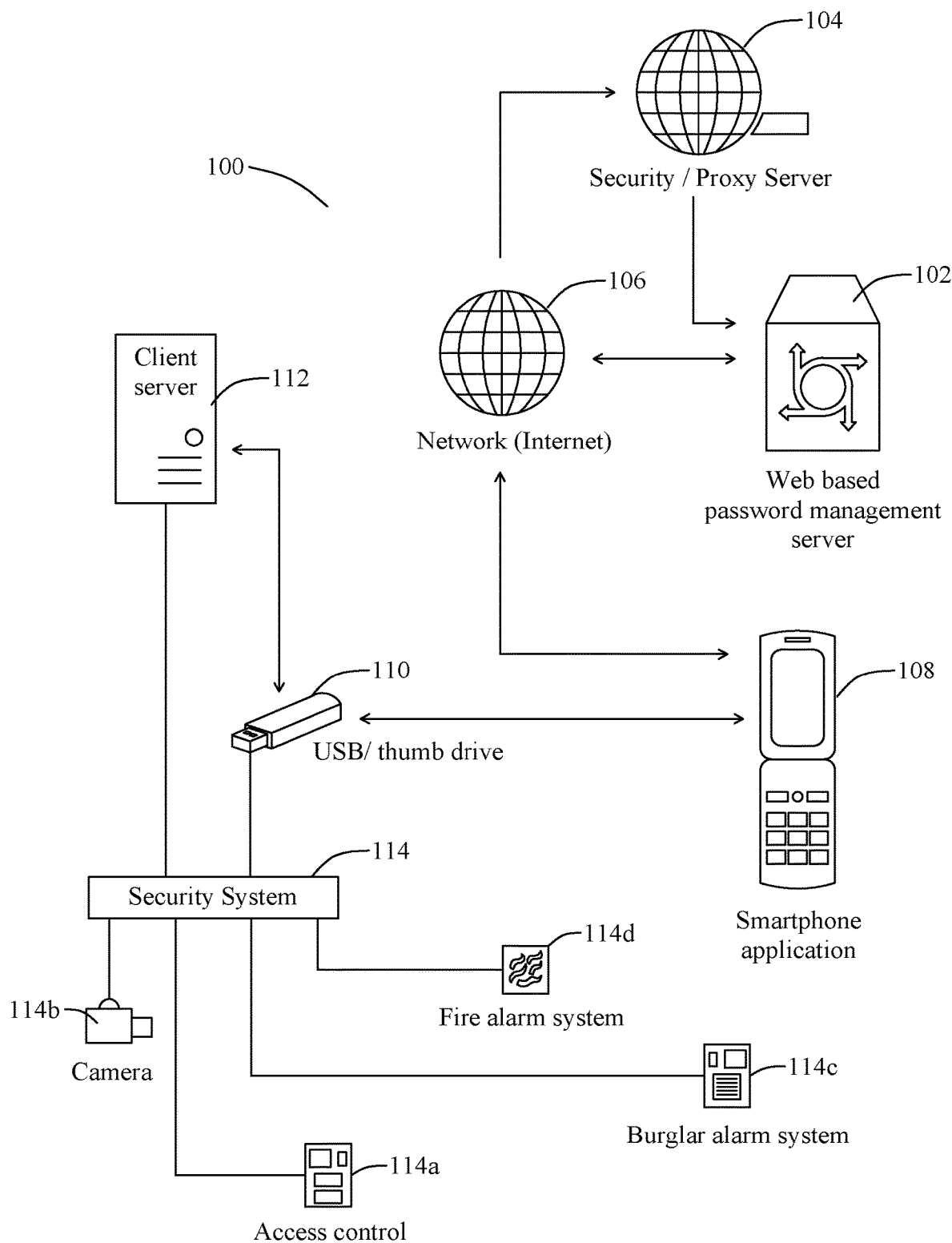
FIG. 1 illustrates a block diagram of a Keystroke Cipher Password Management System in accordance with the embodiments of the present invention.

FIG. 1 shows the detail of the Keystroke Cipher Password Management System 100 in accordance with the various embodiments. In a preferred embodiment of the present invention, the Keystroke Cipher Password Management System 100 comprises a web-based password management server 102, a security/proxy server 104, a network 106 over which numerous electronic devices (for example a user device such as a Smartphone) communicate via wired, wireless or a combination of wired and wireless communication mechanisms, a Smartphone application 108 that may enable individuals to run the application and/or communicate with the web-based password management server 102, and an intelligent USB/Thumb Drive 110 for authorized access of a client server 112 or a security system 114 directly. Hereinafter, the security system 114 includes but not limited to an access control 114a, a CCTV/video surveillance system 114b, a burglar alarm 114c and fire alarm system 114d etc.

Figure 2:
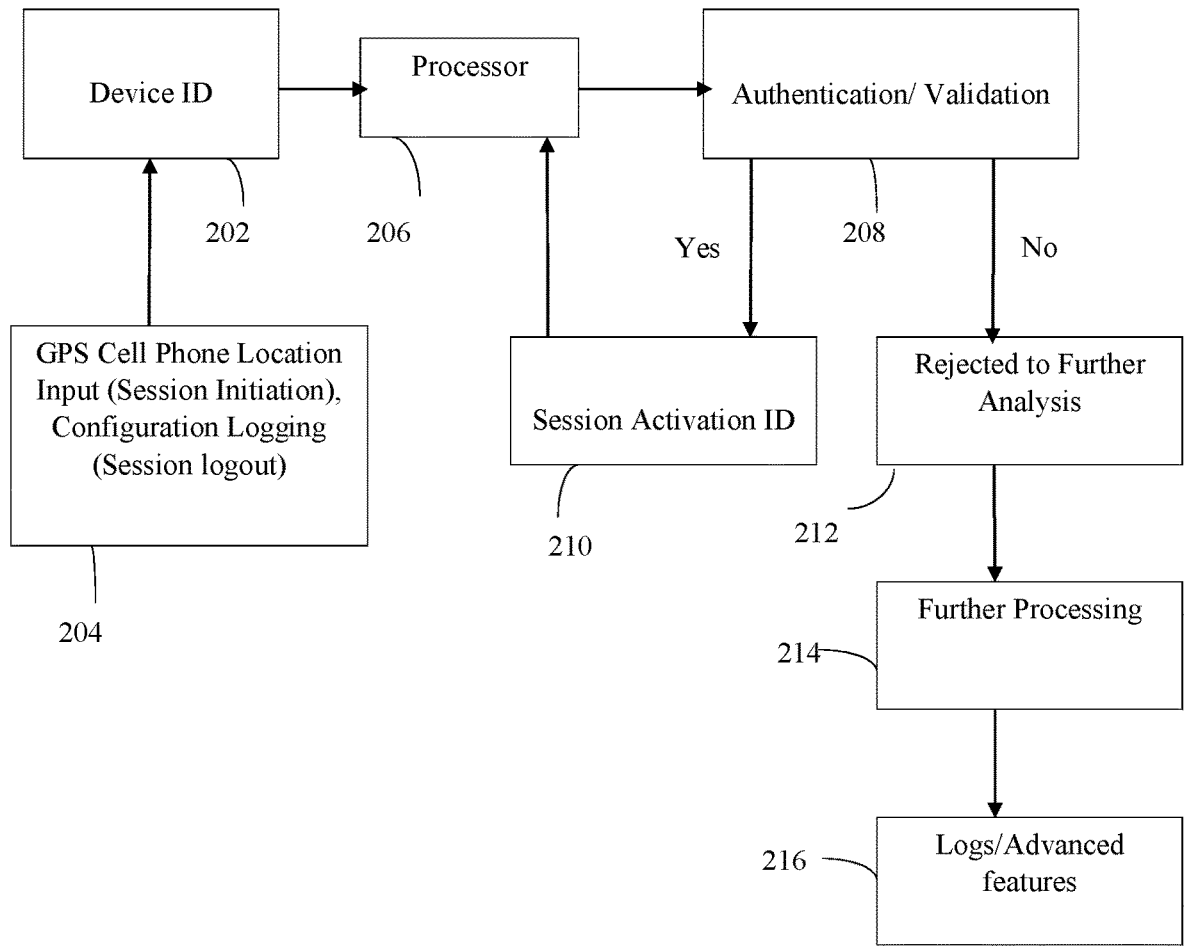
FIG. 2 illustrates a block diagram of a security/proxy server is implemented with the password management server for authenticating/validating one or more user devices in accordance with the embodiments of the present invention.

As shown in the FIG. 2, the security/proxy server 104 is implemented with the password management server 102 for authenticating/validating one or more user devices, where the security/proxy server 104 obtains a Device ID 202 of the user device, where the Device ID 202 further includes retrieving the GPS location 204 of the user device for initiating a season and also storing configuration logins at logout of the session. The security/proxy server 104 further includes a processor 206 for authenticating/validating 208 the user device, once the device is authenticated/validated, a session activation ID 210 is provided to password management server 102. If the device is unable to validate/authenticate on the security/proxy server 104, it goes through a further analysis 212 by the security/proxy server 104 for further processing 214 through Logs/Advanced features 216.

Figure 3:
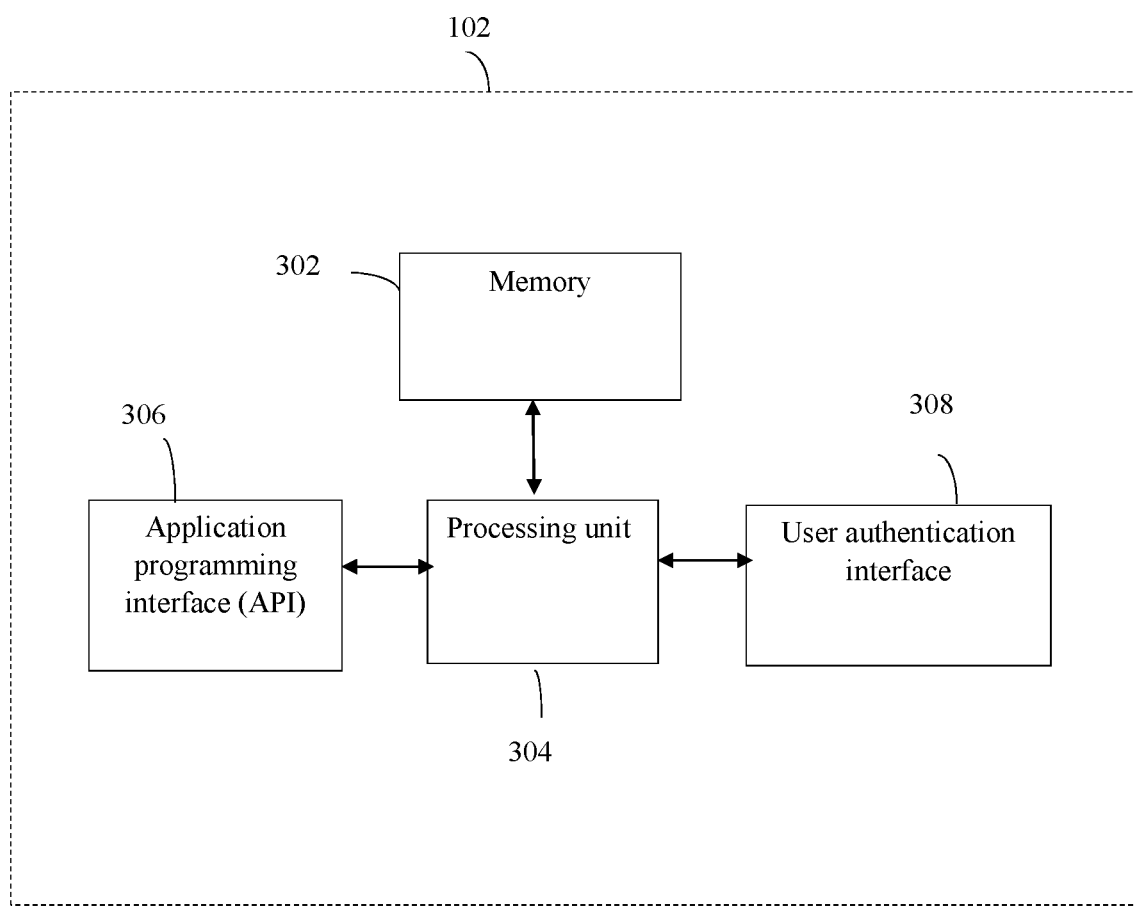
FIG. 3 is a block diagram of a password management server that may be configured in accordance with an example embodiment of the present invention.

As shown in FIG. 3, in one embodiment, the password management server 102 may be a server or other computing platform including memory 302, processing unit 304 having processing capabilities, an application programming interface (API) 306 and a user authentication interface 308 in communication with the network 106 in order to facilitate operation in accordance with embodiments of the present invention.

The password management server 102 stores and manages all the master passwords and provides a secure data communications link to the Smartphone application 108 to facilitate authentication of users and devices attempting to access various resources of the security system 114, such as the access control 114a, the CCTV 114b, the burglar alarm 114c and the fire alarm system 114d etc.

In some embodiments, the password management server 102 may host the Smartphone application 108 which is a password managing and verification app providing access to the functionalities, devices and/or elements described in connection with the security system 114.

According to the embodiments, the password management server 102 includes the application programming interface (API) 306 which is operable to handle the Smartphone application 108 for registration, login, or password reset. For example, the password management server 102 may provide the application programming interface (API) 306 for authentication services along with the security/proxy server 104 that, when used by user device may implement a registration and login procedure that captures and verifies a user's password and/or one or more recovery elements. Once the user is authenticated by the security/proxy server 104, the password management server 102 creates a ciphered password from master password received by the user.

Figure 4:
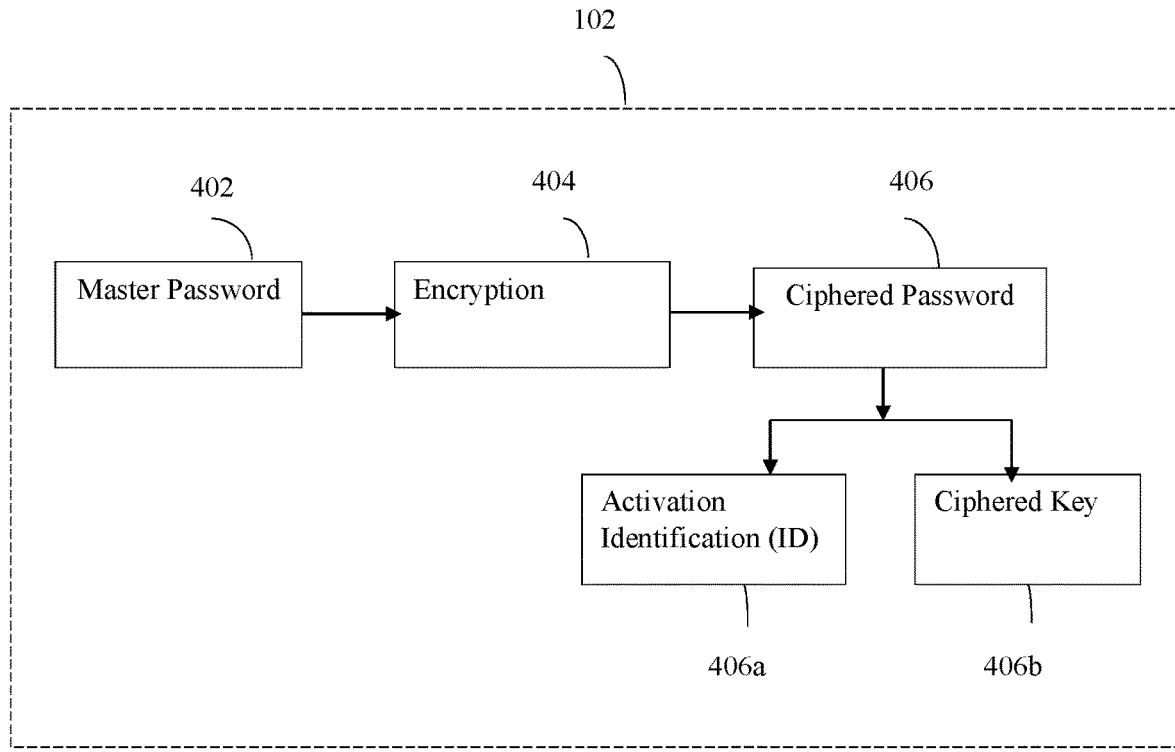
FIG. 4 is a block diagram illustrating generation of ciphered password from a master password by the password management server in accordance with an example embodiment of the present invention.

As shown in FIG. 4, in one embodiment, the password management server 102 performs encryption 404 to create a ciphered password 406 from a master password 402 and passes ciphered version of password to the Smartphone application 108 on the user device with an Activation Identification (ID) 406a and a ciphered key 406b. The information on the Smartphone application 108, specifically the ciphered password 406 with the Activation Identification (ID) 406a and the ciphered key 406b is then Bluetoothed or sent via a Smartphone adapter to the USB drive 110.

Figure 5:
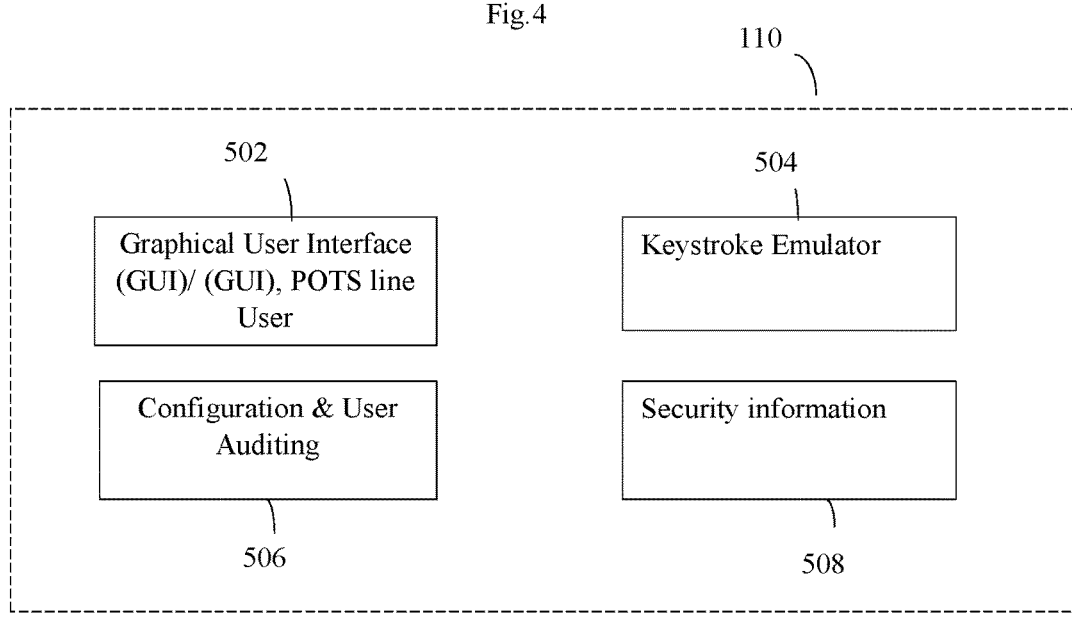
FIG. 5 is a block diagram of a USB Drive that may be configured in accordance with an example embodiment of the present invention.

As shown in FIG. 5, in one embodiment, the USB drive 110 is used at the client server 112 or security System 114 directly or edge device associated with the security system 114 for accessing the configuration features associated with these systems. The USB Drive 110 is configured with a Graphical User Interface (GUI)/POTS line User Interface 502, a Keystroke emulator application 504, Configuration & User Auditing functions 506 and security informations 508. In some embodiments, when users are attempting to access the client server 112 or security system 114 or edge devices through the USB drive 110, the user is navigated to the Graphical user interface (GUI) 502 or in some case a system URL, and the Keystroke emulator application 504 is activated and further Configuration & User Auditing functions 506 is enabled and security informations 508 is checked for authorizing to access. The credentials depending on the system's security requirements, an username is entered and the USB drive 110 is connected to the client server 112 or security system 114 directly or edge device associated with the security system 114 and the Keystroke application 504 on the USB drive 110 deciphers and enters the ciphered password which is ciphered version of master password 402 hidden from the user's view. Further, in some embodiments if logs changes that are made to the security systems 114 or edge device configuration are fetched to Configuration & User Auditing functions 506, and it may be uploaded back to the password management server 102 via the Smartphone application 108.

In some embodiments, the web-based password management server 102 provides a secure data communications link between the client server 112/the security systems 114 and Smartphone application 108.

In some embodiments, the Smartphone application 108 receives logs information and transmits to the web-based password management server 102.

As discussed, the password management server 102 creates a ciphered version of the master password 402 to the ciphered password 406 including the Activation Identification (ID) and the cipher key, and transmits it to the Smartphone application 106 of the user device i.e. Smartphone.

In some embodiments, where the password management server 102 determines the user's credentials from the device ID 202, the password management server 102 send ciphered password 406 to the user device to use for log-in. Further, the user can retrieve the stored passwords using the ciphered password 406 instead of using a master password 402. Since the ciphered password 406 is used instead of a master password 402, only the registered user device may be capable of receiving and decrypting the encrypted passwords from the password management server 102.

Any needed updates to the system's configuration will take place through Configuration & User Auditing functions 506 of the USB Drive 110, Smartphone app 108 or corporate based internet attached docking station without departing from the scope of the disclosure. In some embodiments, the Keystroke Cipher Password Management System 100 includes provisions for adding and removing new and existing system users through authenticating/validating by the security/proxy server 104.

The Smartphone application 108 communicates with a web-based password management server 102, via cellular or WiFi, and receives an encrypted ciphered password 406, then passes the encrypted ciphered password 406 to a USB Drive 110, where the Keystroke emulator application 404, which is Cipher software that decrypts the ciphered password 406 when connecting to the client server 112 or the security system 114.

Once the USB/Thumb drive 110 is connected into a USB port (not shown) of the client server 1120 or security system 114, the ciphered version of the password is displayed on the Smartphone application 108. The technician opens the Graphical user interface (GUI) 502 to login on the Client Server 112 or the security system 114 or and the Keystroke application 504 enters the ciphered password 306 which is the actual password that is not visible to the technician.

As discussed above, the USB drive 110 is configured with the Graphical user interface (GUI)/POTS line User Interface 502, the Keystroke emulator application, the Configuration & User Auditing functions 506 is enabled and the security informations 508 In some embodiments, while attempting to access the client server 112 or the security system 114, the user is navigated to the GUI or system URL and activates the Keystroke application 504, uses the cipher keys to decipher the ciphered password 406. Further records changes to system is fetched by the Configuration & User Auditing functions 506 and provides a log to the Smartphone application 108. This information is delivered to the password manager server 102 and stored with a session identification number for audits or other future use.

In some embodiments, the user may not even have to request the client server 112 in order to log into any given security systems 114 as the USB drive 114 if plugged into the client server 112 may automatically detect and the user is navigated to a given security systems 114 to automatically populate the login credentials of the given account. In one embodiment of the present disclosure, the password manager server 102 may respond with, e.g., "authorized" or "unauthorized" on the client server 112 or security systems 114 directly, based on whether the user client server 112 was identified and authorized to access to the account, which may provide access to a security system 114.

Figure 6:
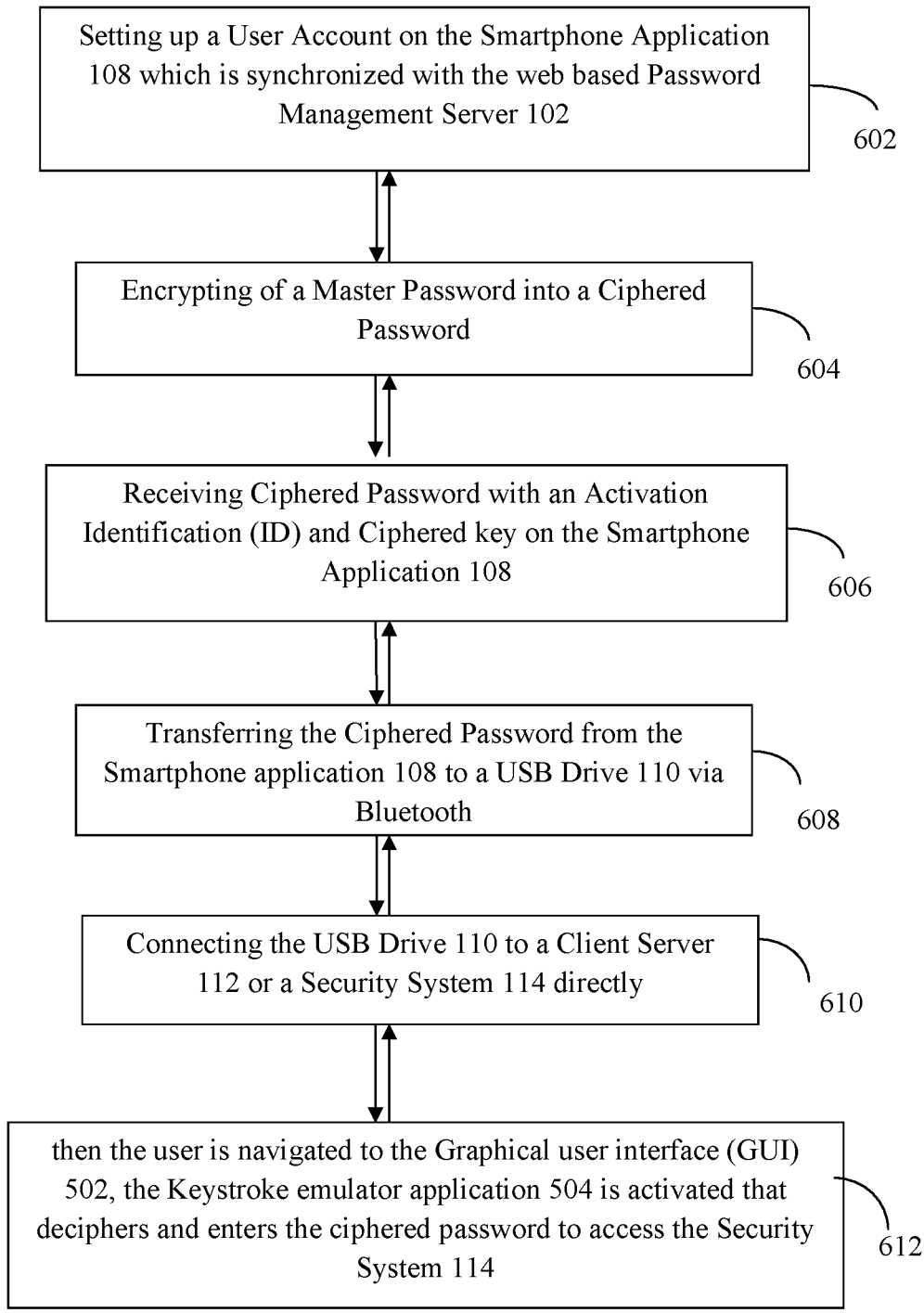
FIG. 6 is a flowchart of an exemplary method of authentication of a user on the Keystroke Cipher Password Management System in accordance with the embodiments of the present invention.

As shown in FIG. 6, is an exemplary method of authentication and registration of a user on a Keystroke Cipher Password Management System 100 in accordance with at least one embodiment.

At step 602, the user logs on to the Smartphone application 108 and establishes an account. The Smartphone application 108 is synchronized with the web-based password management server 102 implemented with the security/proxy server 104 establish secure links and to authenticate/validate the user device. After successfully setting up an account, the web-based password management server 102 store a master password.

At Step 604, the password management server encrypts a Master Password 402 into a Ciphered Password 406 the client server 112 or the security system 114 associated with the user account. At step 606, the user receives the Ciphered Password 406 along with an Activation Identification (ID) 406a and a Ciphered key 406b on the Smartphone Application 108.

At step 608, the user transmits the Ciphered Password 406 with the Activation Identification (ID) 406a and the Ciphered key 406b from the Smartphone application 104 to a USB Drive 110 via Bluetooth®.

At step 610, the USB drive 110 is then connected to the client Server 112 or a security System 114 directly, after receiving the Ciphered Password 406, prior to the predetermined time expires, the client Server112 or the security system 114 and the USB drive 110 is synced with the Smartphone application 108.

At step 612, once the client server 112, or the security system 114, the smartphone application 108 and the USB interface 110 are synchronized, establishes a communication with the security system 114. In one example, the synchronization of cryptographic key information occurs between the client server 112, the security system 114 and the USB Drive 110. The password manager server 102 will then receive the information about the user and the user's one or more security systems 114 associated with the particular client server 112, which was synchronized with the USB drive 110 and the smart phone application 108.

Embodiments of the invention provide improved methods for managing passwords using ciphered password 406 instead of master password 402. The application 108 installed on a user's device can register with the password management server 102. The password management server 102 can then associate the user's stored passwords with the ciphered password 406 during password retrieval, changes and updating. Thus, instead of establishing a master password 402 during registration, the user device registers their generated ciphered password 406 with the password management server 102.

Figure 7:
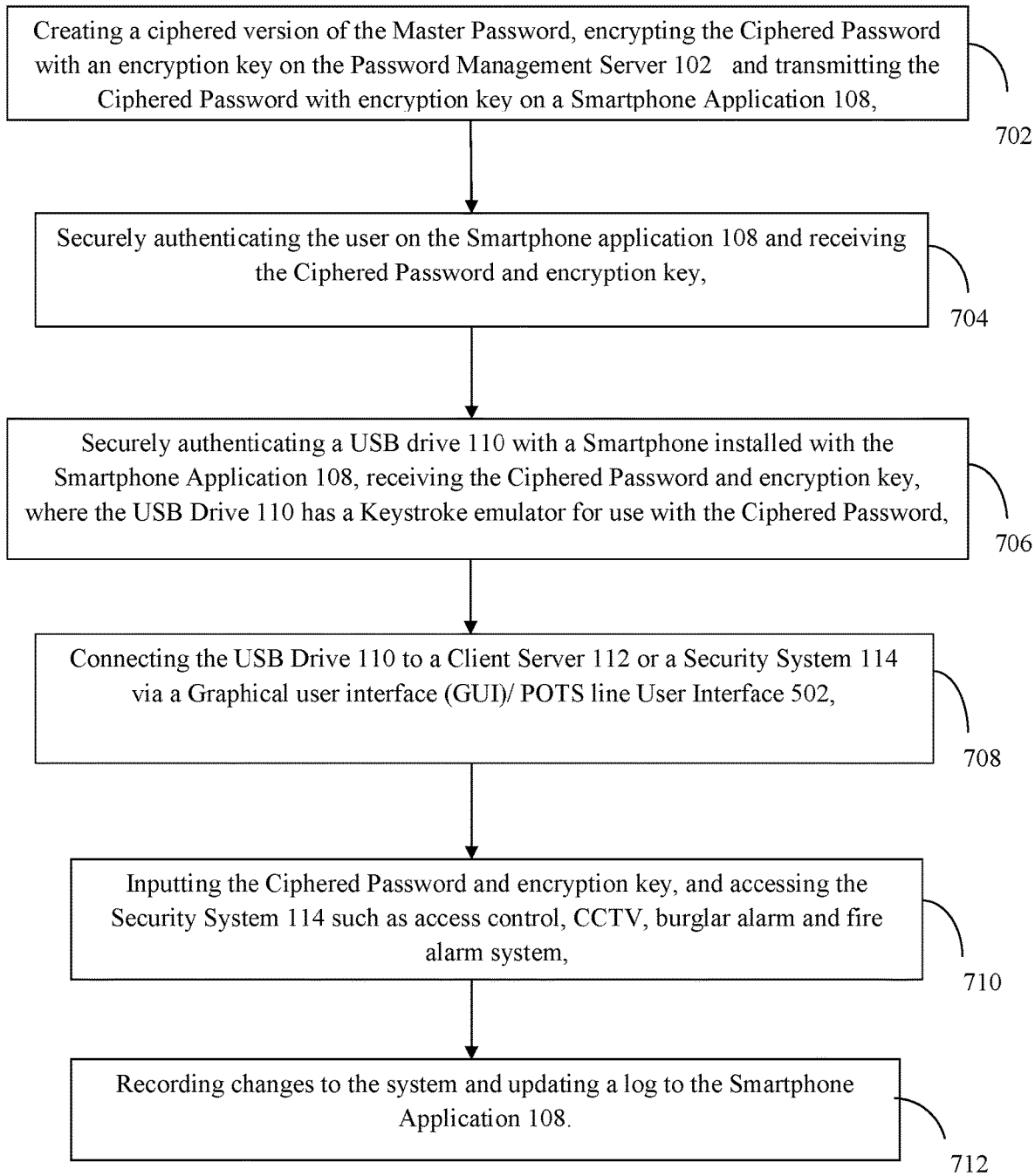
FIG. 7 is a flowchart of a method of protecting a master password from technicians/employees that needs access to at least one of the security systems in accordance with the embodiments of the present invention.

In another embodiment the present invention provides a method of protecting a master password from technicians/employees that needs access to one or more security system 114 such as an access control 114a, CCTV 114b, burglar alarm 114c and fire alarm system 114d on networks with no Internet access. The method provides storing and managing all master passwords of the security system 114 with a web-based password management server 102. As shown in FIG. 7, the method includes at step 702, is creating a ciphered version of the master password, encrypting the ciphered password on the password management server 102 and transmits it to the Smartphone application 108; at step 704, is securely authenticating the user on the Smartphone application 108, receiving the cipher key of the ciphered password; at step 706, is securely authenticating USB drive 110 with the Smartphone application 108, receiving the ciphered password, where the USB drive 110 has a keystroke emulator application for use with the ciphered password; at step 708, is connecting the USB drive 110 with the security system 114 such as an access control 114a, a CCTV 114b, a burglar alarm 114c and a fire alarm system 114d via web browser or Graphical user interface (GUI) 502; and at step 710, the user inputs the ciphered password of the true master password via the keystroke emulator application 604, and provides access to the security system 114 and at step 712, records changes to the security system 114 and provides a log to the Smartphone application 108, this log is used to prevent unauthorized changes of the master password and configuration changes. The method described herewith in various steps is an exemplary method without departing from the scope of the invention.

In some embodiments, some of the operations above may be modified or further amplified. Furthermore, in some embodiments, additional optional operations may be included. Modifications, amplifications, or additions to the operations above may be performed in any order and in any combination.

The embodiments of the invention described herein are implemented as logical steps in one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A system for managing and protecting a master password without exposing to technicians/employees accessing to at least one security system on a network with no internet access, the system comprising:
   a security/proxy server, implemented with a web based password management server for authenticating/validating a user devices by a device ID, where the security/proxy server retrieves GPS location of the user device, and initiate a session;
   the web based password management server, comprising;
      at least one processing unit;
      at least one non-transitory memory storing instructions that, when executed configure to:
      create a cipher password from a master password of an account of a user associated with the user device, and derive an encryption key based at least in part on the cipher password;
   a Smartphone application, configured to receive the cipher password with the encryption key on the user device; and
   a USB drive, configured to receive the cipher password with the encryption key from the Smartphone application by securely authenticating the USB drive by the Smartphone application,
   wherein, the USB drive is connected to a client server or security system directly to enter the ciphered password with the encryption key, where the USB drive comprises a Graphical User Interface (GUI) and a Keystroke emulator application, when the USB drive is connected to the client server or the security system, the user is navigated to the Graphical user interface (GUI) and the Keystroke emulator application is activated that deciphers and enters the ciphered password with the encryption key hidden from the user's view.

2. The system of claim 1, wherein the web based password management server stores the master password in association with a unique ID associated with the user.

3. The system of claim 1, wherein the security/proxy server retrieves GPS location of the user device for initiating the session and stores configuration logins at logout of the session.

4. The system of claim 1, further provides an ability to add users, remove users and validate users while retaining the master password safe without exposing the password from viewing by users.

5. The system of claim 1, wherein the managing and protecting the master password of a user account of at least one of the security system on a network with no internet access.

6. The system of claim 1, wherein the web based password management server provides the ciphered password and the encryption key to access to at least one security system.

7. The system of claim 1, wherein the security system is atleast one access control.

8. The system of claim 1, wherein the security system is atleast one CCTV/surveillance system.

9. The system of claim 1, wherein the security system is atleast one burglar alarm.

10. The system of claim 1, wherein the security system is atleast one fire alarm system.

11. The system of claim 1, wherein the ciphered password is Bluetoothed or sent via a Smartphone adapter from the Smartphone application to the USB drive.

12. A method of managing and protecting a master password from technicians/employees that need access to at least one security system, the method comprising:
   creating a ciphered password with an encryption key of a master password of an account of a user by a web based password management server;
   transmitting the ciphered password on a Smartphone application on a user device by securely authenticating the user device on a security/proxy server;
   receiving the ciphered password on a USB drive by securely authenticating the USB drive with the Smartphone Application on the user device; and
   connecting the USB drive to a client server or a security system,
wherein, the USB drive comprising a Graphical User Interface (GUI) and a Keystroke emulator application, when the USB drive is connected to the client server or the security system, the user is navigated to the Graphical user interface (GUI) and the Keystroke emulator application is activated that deciphers and enters the ciphered password with the encryption key hidden from the user's view.

13. The method of claim 12, wherein the web based password management server provides the ciphered password and the encryption key to access to at atleast one security system.

14. The method of claim 12, wherein the method further comprising authenticating/validating the user device on the security/proxy server, where the security/proxy server obtains a Device ID of the user device and retrieve a GPS location of the user device for initiating a session and further storing configuration logins at logout of the session.

15. The method of claim 12, wherein the managing and protecting the master password of a user account of at least one of the security system on a network with no internet access.

16. The method of claim 12, wherein further provides access to configurations and features of the security system, where one of the security system is atleast one access control.

17. The method of claim 12, wherein one of the security system is atleast one CCTV/surveillance system.

18. The method of claim 12, wherein one of the security system is atleast one burglar alarm.

19. The method of claim 12, wherein one of the security system is atleast one fire alarm system.

20. The method of claim 12, further provides an ability to add users, remove users and validate users while retaining the master password safe without exposing the password from viewing by users.

* * * * *